United States Patent [19]

Junkers et al.

[11] 4,423,649
[45] Jan. 3, 1984

[54] RATCHET DRIVE WITH AN EQUAL LOAD DOUBLE PAWL ARRANGEMENT

[75] Inventors: John K. Junkers, Saddle River, N.J.; Wilhelm Krautter, Portland, Pa.

[73] Assignee: Unex Corporation, South Hackensack, N.J.

[21] Appl. No.: 225,408

[22] Filed: Jan. 15, 1981

[51] Int. Cl.³ .............................................. B25B 13/46
[52] U.S. Cl. .................................. 81/57.39; 74/577 M
[58] Field of Search .............. 81/57.39, 61; 74/577 M, 74/577 R, 577 S; 254/107

[56] References Cited

U.S. PATENT DOCUMENTS 3,290,953 12/1966 Ulm ....................................... 74/577
4,336,727 6/1982 Junkers ............................... 81/57.29

Primary Examiner—James L. Jones, Jr.
Attorney, Agent, or Firm—Michael J. Striker

[57] ABSTRACT

A ratchet drive comprises a support in which the trunnions of a ratchet gear are mounted. A pair of transversely spaced drive plates are also mounted on the support for tilting movement about the axis of the ratchet gear between an active stroke and a return stroke so that front ends of a pair of drive pawls connected to the drive plates engage, during each active stroke of the latter, adjacent teeth of the ratchet gear to turn the latter through a predetermined angle during each active stroke. A member is mounted between the drive plates for pivoting movement about a pivot axis extending parallel and spaced from the axis of the ratchet gear and the rear ends of the drive pawls are mounted on the member respectively to opposite sides of the pivot axis, so that if during the active stroke of the drive plates the front end of only one of the pawls should, due to manufacturing tolerances, engage the respective tooth, the thrust imparted by the one drive pawl will turn the member about its pivot axis to bring the front end of the other pawl in engagement with the adjacent tooth to equalize the load on the two teeth during each active stroke of the drive plates.

10 Claims, 8 Drawing Figures

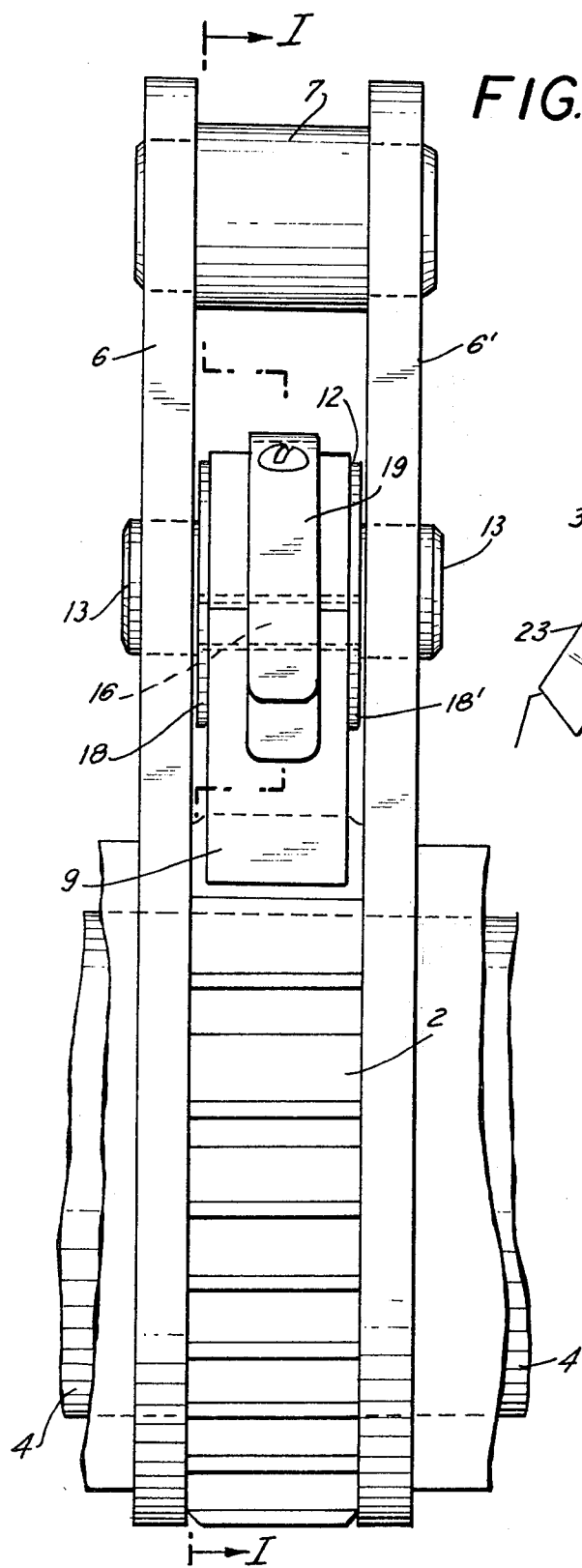
FIG. 2
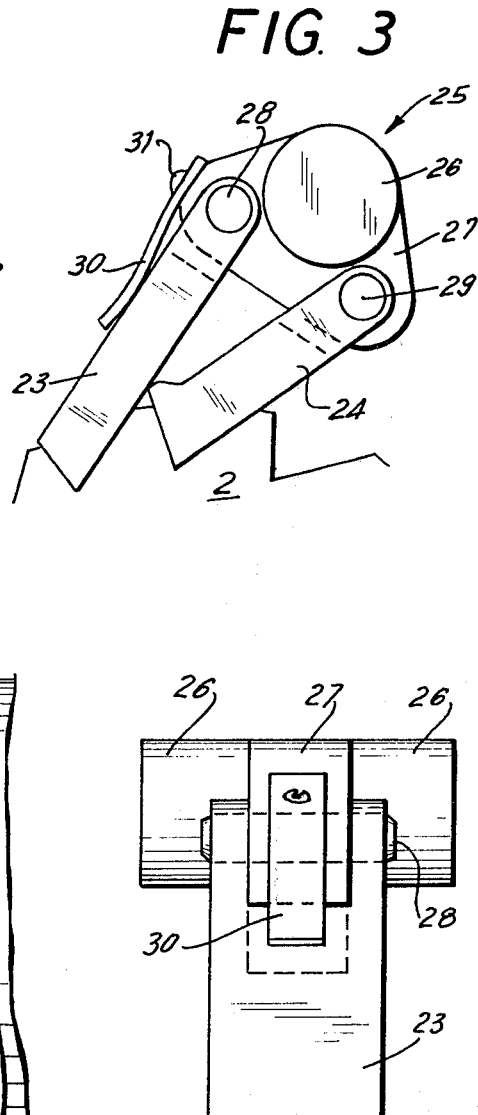
FIG. 3
FIG. 4

RATCHET DRIVE WITH AN EQUAL LOAD DOUBLE PAWL ARRANGEMENT

BACKGROUND OF THE INVENTION

The present invention relates to a ratchet drive with an equal load double pawl arrangement, especially used for a ratchet wrench.

In ratchet drives, especially in ratchet drives used in ratchet wrenches, it is desirable to maintain a constant torque during each active stroke of the ratchet pawl. Evidently the torque accuracy is increased with an increase of the number of teeth contained in the ratchet gear in which a smaller stroke may be used for turning the latter. For example, a ratchet drive in which the ratchet gear has 12 teeth, requires a turn of 30° prior to permitting a new pawl engagement, and this in turn will result in a torque accuracy of only $\pm 5\%$. By increasing the number of teeth to, for example, 24 teeth, the torque accuracy can be improved to $\pm 2\frac{1}{2}\%$. On the other hand, it is desirable, especially in ratchet drives used for wrenches, to hold the outer diameter of the ratchet gear as small as possible, so that the wrench may be applied to threaded connectors which are spaced relatively small distances from each other. If the number of teeth is increased, while the outer diameter of the ratchet gear is maintained, the individual teeth of the ratchet gear will evidently become smaller. If a given torque is required, while the tooth size is reduced, the danger exists that the tooth will break under the force of a single pawl applied thereto. This danger of breaking the ratchet gear is even further increased if the ratchet drive is used in a wrench in which, in order to reduce the height of the wrench, a polygonal passage is coaxially formed through the ratchet gear for engagement with a polygonal head of a threaded connector to be tightened or loosened by the wrench.

While attempts have already been made to overcome this difficulty by providing a pawl construction to engage a plurality of adjacent teeth during the forward stroke of the pawl, this arrangement has not worked out satisfactorily in practice since due to unavoidable machining tolerances it is practically impossible that the various engaging faces of such a pawl will actually simultaneously engage the corresponding faces of a plurality of teeth so that each of the engaged teeth is equally loaded.

SUMMARY OF THE INVENTION

It is an object of the present invention to provide a ratchet drive, especially usable for ratchet operated wrenches, in which during the active stroke of the ratchet drive, a substantially constant torque may be maintained while the danger of breaking the teeth of the ratchet gear is avoided.

It is a further object of the present invention to provide a ratchet drive in which two pawls are used for driving the ratchet gear during the active stroke of the pawls, in which the pawls are arranged in such a manner to assure an equal load applied by each of the two pawls on the respective teeth of the ratchet gear.

With this and other objects in view, which will become apparent as the description proceeds, the ratchet drive according to the present invention with an equal load double pawl arrangement mainly comprises support means, a ratchet gear mounted on the support means for turning about its axis, drive plate means mounted on the support means for tilting movement about the aforementioned axis between an active stroke and a return stroke, a pair of drive pawls having front ends arranged for engagement with teeth of the ratchet gear during the active stroke of the drive plate means to thereby turn the ratchet gear through a given angle in one direction, and means mounting the rear ends of the two drive pawls on the drive plate means for shifting, if due to manufacturing tolerances the front end of only one of the drive pawls should during the active stroke of the drive pawl means initially engage the corresponding tooth, the other drive pawl means in substantially axial direction into engagement with an other tooth to equalize the load on the two teeth during each active stroke of the drive plate means.

The aforementioned mounting means preferably comprise a member mounted on the drive plate means tiltable about a pivot axis, spaced from the axis of the ratchet gear and the rear ends of the two pawls are mounted on the member to opposite sides of the aforementioned pivot axis.

In a preferred arrangement according to the present arrangement, the rear ends of the two drive pawls are mounted on the aforementioned member, tiltable about axes respectively arranged on opposite sides of the pivot axis of this member.

The aforementioned drive plate means preferably comprise two transversely spaced drive plates, each formed with a first bore coaxial with the axis of the ratchet gear and with a second bore coaxial with the aforementioned pivot axis of the member, and the ratchet gear and the aforementioned member have in this construction each a main portion located between the two drive plates and a pair of trunnions respectively projecting to opposite sides of the main portion and respectively turnably mounted in the first and the second bores of the drive plates.

The rear ends of the drive pawls may have a semi-cylindrical configuration and the aforementioned member may be formed with a pair of cutouts respectively located at opposite sides of the pivot axis thereof and having each a portion of semi-cylindrical configuration against which the semi-cylindrical rear ends of the drive pawl abut during the active stroke of the drive pawls, to take up the thrust imparted to the pawls. In this construction additional means are necessary for maintaining the rear ends of the drive pawls in the cutouts during the return stroke of the drive plates.

The means for maintaining the drive pawls in the cutouts during the return stroke of the drive plates may comprise a pair of thin discs respectively sandwiched between the pair of drive plates and the main portion of the member, surrounding the trunnions of the latter, a pair of pins respectively mounted in bores through the rear ends of the drive pawl, coaxially with the semi-cylindrical portions thereof and having outer ends respectively extending with clearance through corresponding bores in the discs. Such clearance is necessary in order to assure that the thrust imparted to the drive pawls during the active stroke of the drive plates, is actually taken up by the semi-cylindrical portions of the cavities in the member and not by the discs.

In another modification according to the present invention, the main portion of the aforementioned member is plate-shaped and the rear end of each drive pawl is bifurcated and encompasses a portion of the plate-shaped main portion of the member, and in this construction a pair of pivot pins are provided respectively located to opposite sides of the axis of the trunnions of the member, and passing through bores in the member and corresponding bores through the bifurcated rear ends of the drive pawls. In this construction the thrust imparted to the drive pawls is taken up by the aforementioned pins.

In a further embodiment according to the present invention, the main portion of the aforementioned member is substantially cylindrical and provided with a cutout extending from the outer surface into the main portion and having a pair of parallel side faces and an end face normal to the latter, in which the drive pawls are arranged in side-by-side engagement with each other and the rear ends thereof are press-fitted into the cutout with the rear faces of the drive pawls engaging the rear face of the cutout. The aforementioned cutout may be formed only in the main portion of the member or extended to opposite sides of the main portion through the trunnions thereof. The first mentioned variation of this construction has the disadvantage that the cutout is evidently more difficult to machine than in the second variation, but the first variation has the advantage that the trunnions are not cut and weakened by the cutout passing in longitudinal direction therethrough.

BRIEF DESCRIPTION OF THE DRAWING

FIG. 2 is a front view of the ratchet drive shown in FIG. 1;

FIG. 3 is a side view of a modification of the member supporting the drive pawls and showing also the drive pawls mounted on the member and a portion of the ratchet gear, whereas the drive plates for moving the pawls during the active and the return stroke are omitted from FIG. 3 and the following figures;

FIG. 4 is a front view of the member and drive pawls shown in FIG. 3;

DESCRIPTION OF THE PREFERRED EMBODIMENTS

Figure 1:
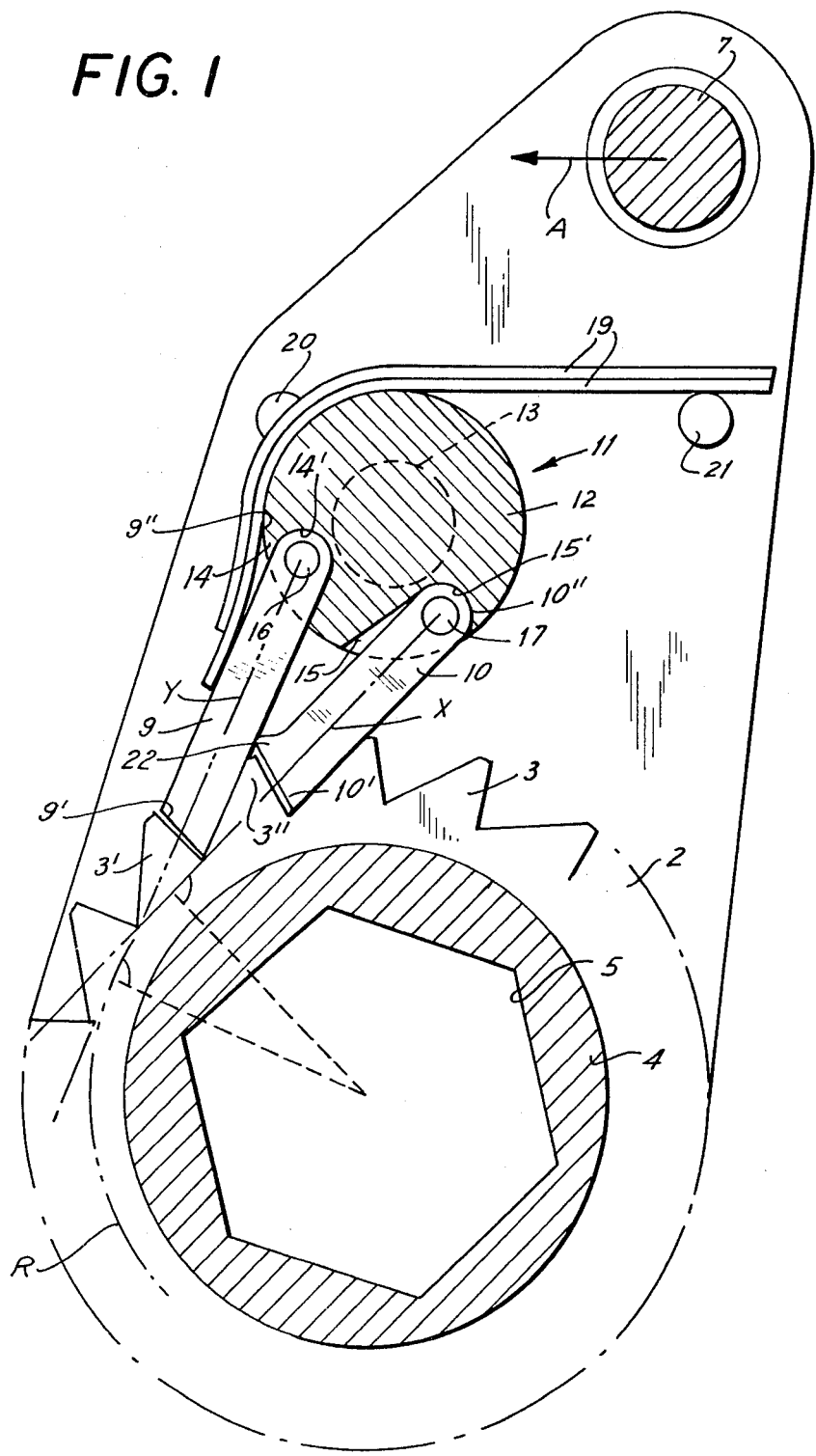
FIG. 1 is a section taken along the line I—I of FIG. 2 of the ratchet drive according to the present invention.

Referring now to the drawing, and more specifically to FIGS. 1 and 2 of the same, it will be seen that the ratchet drive according to the present invention mainly comprises support means 1, only schematically indicated in FIG. 2 and rotatively supporting a ratchet gear 2, provided at its outer periphery with a plurality of teeth 3, by means of a pair of trunnions 4 projecting to opposite sides of the main portion of the ratchet gear and extending through corresponding bores of the support means 1. Such support means may for instance be constituted by side plates of a wrench, as for instance disclosed in the U.S. Pat. No. 4,027,561 to Junkers. A pair of transversely spaced drive plates 6, 6' are likewise tiltably supported on the aforementioned support means 1 or on the trunnions 4 of the ratchet gear 2 for tilting movement between an active forward stroke, as indicated by the arrow A in FIG. 1, and a return stroke. A pin 7 extends with reduced diameter portions thereof through bores in the region of the upper ends of the two drive plates 6 and 6', and conventional means, not shown in the drawing are connected to this pin for moving the drive plates 6 and 6' between an active stroke and a return stroke. Such means may for instance be constituted by hydraulically operated cylinder and piston means as clearly disclosed in the aforementioned patent.

In order to reduce the active stroke of the drive plate 6, 6' to thus hold the torque applied to the ratchet gear 2 substantially constant, the ratchet gear 2 is provided with a relatively great number of teeth 3 which, if the outer diameter of the ratchet gear should not be increased to an undesirable extent, become relatively weak. In order to avoid breakage of these relatively weak teeth, two drive pawls 9 and 10 are provided which engage with their front ends 9' and 10' respectively two adjacent teeth, for instance the teeth 3' and 3''. To assure that despite any unavoidable manufacturing tolerances in machining the teeth 3 of the ratchet gear 2 and in machining the drive pawls 9 and 10, the front ends 9' and 10' of the two drive pawls, will during the forward stroke of the drive plate 6,6' properly engage the engaging faces of the respective teeth, the rear ends 9'' and 10'' of the pawls 9 and 10 are of semi-cylindrical configuration and engage correspondingly semi-cylindrical portions 14' and 15' of cavities 14 and 15 formed in a member 11 having a cylindrical main portion 12 and a pair of trunnions 13 projecting to opposite sides of the main portion 12, through corresponding bores in the drive plates 6 and 6', so that the member 11 is tiltable about a pivot axis parallel and spaced from the axis of the ratchet gear 2. As clearly shown in FIG. 1, the cavities 14 and 15 provided in the member 11 widen in outward direction from the semi-cylindrical inner portions 14' and 15' respectively, to permit tilting of the pawls during the return stroke of the drive plates 6 and 6'.

In this construction, if due to the mentioned unavoidable manufacturing tolerances, for instance only the end face 9' and the pawl 9 should initially engage the teeth 3', while the end face 10' of the pawl 10, is still slightly spaced from the corresponding face of the tooth 3'', then the thrust on the pawl 9 will turn the member 11 in clockwise direction about its axis to bring the end face 10' of the pawl 10 in engagement with the corresponding face of the tooth 3'', so that the load applied by the pawls 9 and 10 during the active stroke of the drive plates will be equally divided between the two teeth 3' and 3'' and breaking of the teeth will be avoided. This uniform distribution of the load is especially important if, as shown in FIG. 1, the trunnions 4 and the main portion of the ratchet 2 between the trunnions are formed with a polygonal, for instance, a hexagonal passage 5 therethrough for engagement with the polygonal head of a threaded connector for tightening or loosening the threaded connector during the active strokes of the drive plates.

It will be noted from FIG. 1, that the two drive pawls 9 and 10 are inclined with respect to each other in such a manner that the lines of thrust x and y provided by the two pawls are tangential to the same circle R concentric with the axis of the ratchet gear so that each pawl will provide the same moment to the ratchet gear 2 during the active stroke of the drive plates.

In order to maintain the rear ends of the drive pawls 9 and 10 during the return stroke of the drive plates 6, 6' in the cavities 14 and 15, there are provided two annular discs 18, 18' sandwiched between the main portion 12 of the member 11 and the adjacent drive plates 6, 6' and extending about the trunnions 13 of the member 11 and pins 16 and 17 respectively extend through bores in the rear ends of the pawls 9 and 10 and with clearance through corresponding bores in the discs 18 and 18' and likewise with clearance through a bore in the main portion 12 of the member 11.

In order to maintain the drive pawls 9 and 10 in engagement with the teeth of the ratchet gear 2, spring means are provided biasing the drive pawl 9 into engagement with the teeth 3 of the ratchet gear 2. Such spring means are shown in the drawing as a pair of leaf springs 19, fastened at 20 by a screw or the like to the main portion 12 of the member 11 and engaging with the front portions thereof the left face, as viewed in FIG. 1, of the pawl 9, while the rear portions of the leaf springs 19 are in sliding engagement with a pin 21 extending between the drive plates 6 and 6'. To avoid the necessity of providing separate spring means for maintaining also the pawl 10 in engagement with the teeth 3, the pawl 10 is simply provided at its free end thereof with a small projection 22 engaging the rear face of the pawl 9 so that the pawl 10 is also held by the action of the leaf springs 19 in engagement with the teeth 3 of the ratchet gear.

FIGS. 3 and 4 illustrate a second embodiment of the member for mounting the rear ends of the drive pawls and for simplification reason the drive plates in which the trunnions of this member are mounted are omitted in FIGS. 3 and 4 and only part of the ratchet gear 2 is shown. The mounting member 25 for mounting the rear ends of the drive pawls 23 and 24 comprises a plate-shaped substantially triangular main portion 27 from which two trunnions 26 project in opposite direction. These trunnions 26 are arranged at one corner of the triangular-shaped main portion 27, whereas the upper ends of the two drive pawls 23 and 24 are connected in the regions of the other corners of the triangular-shaped main portion 27 by pivot pins 28 and 29 extending through bores provided in the bifurcated upper ends of the drive pawls 23 and 24 and through a corresponding bore in the plate-shaped main portion 27. In this case the thrust of the drive pawls will be taken up by the pins 28 and 29 and respectively transmitted by these pins to the main portion 27 of the mounting member 25. A spring 30 fastened at 31 to the main portion 27 and engaging the left face, as viewed in FIG. 3, of the pawl 23 biases the latter in engagement with the teeth of the ratchet gear 2 and the drive pawl 2 is again provided in the region of the lower end thereof with the projection 22 engaging the rear face of the drive pawl 23 so that the spring 30 will also maintain the pawl 24 in engagement with the teeth of the ratchet gear 2. It is believed to be evident that the same results will be obtained with the construction as shown in FIGS. 3 and 4 as with the construction illustrated in FIGS. 1 and 2 and that therefore no further explanations in this respect are necessary.

Figure 5:
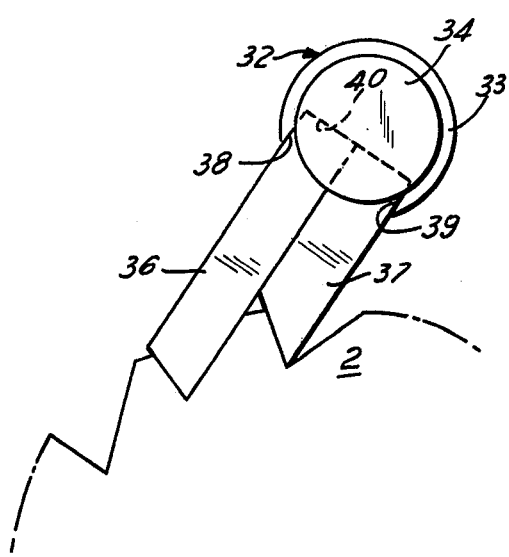
FIG. 5 is a side view of a third embodiment of the member supporting the drive pawls and showing also the drive pawls and part of the ratchet gear.
Figure 6:
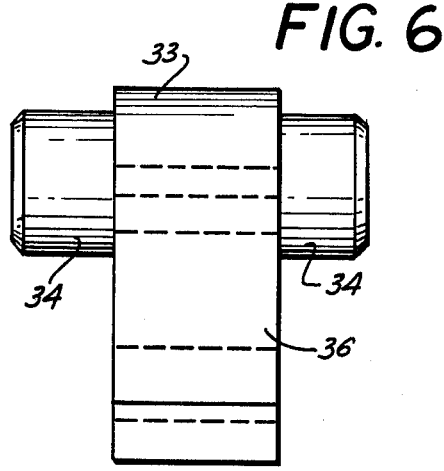
FIG. 6 is a front view of the member and pawls shown in FIG. 5.

FIGS. 5 and 6 illustrate a third embodiment of a mounting member for mounting the rear ends of the drive pawls, and in these FIGS. the drive plates are again omitted and the ratchet gear is only partially shown in FIG. 5. The mounting member 32 illustrated in the embodiment shown in FIGS. 5 and 6 comprises a cylindrical main portion 33 and two trunnions 34 of reduced diameter projecting coaxially with the main portion 33 from opposite sides of the latter. The cylindrical main portion 33 is formed with a cavity or cutout of substantially rectangular cross section defined, as best shown in FIG. 5, by a pair of parallel side faces 38 and 39 and a bottom face 40 extending normal thereto in which the rear or upper ends of the two drive pawls 36 and 37 are press-fitted in side-by-side engagement with each other. Spring means, not shown in FIGS. 5 and 6, are again provided and such spring means may be constructed and arranged as shown at 19 in FIG. 1 or as shown at 30 in FIG. 3.

Figure 7:
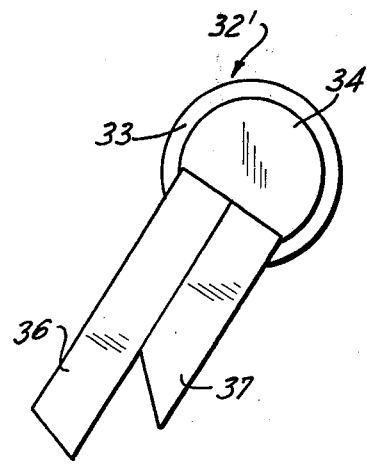
FIG. 7 is a side view of a variation of the elements shown in FIG. 5.
Figure 8:
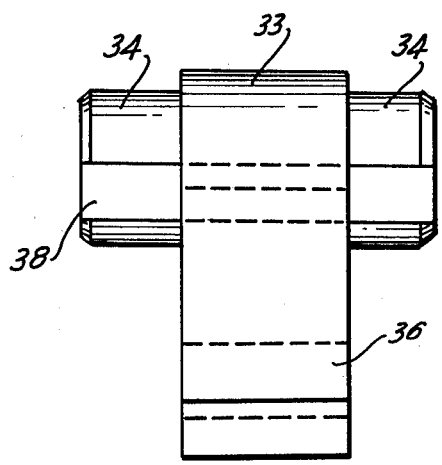
FIG. 8 is a front view of the elements shown in FIG. 7.

A slight modification of the mounting member shown in FIGS. 5 and 6 is illustrated in FIGS. 7 and 8. The mounting member 32' shown in FIGS. 7 and 8 again includes a cylindrical main portion 33 and trunnions 34 projecting from opposite sides of the latter and the arrangement shown in FIGS. 7 and 8 differs from that illustrated in FIGS. 5 and 6 only that the cavity in which the end portion of the drive pawls 36 and 37 are press-fitted is not only formed in the main portion 33, but is extended also in form of slots 38 through the trunnions 34. This facilitates machining of the cavity since the same including the slots 38 may be formed by a single milling operation, but this construction has the disadvantage with regard to the construction shown in FIGS. 5 and 6 that the trunnions are weakened and provided with sharp edges which may increase the wear of the bores in the drive plates in which the trunnions 34 are lodged.

It is believed to be evident that with the two embodiments illustrated in FIGS. 5-8 substantially the same results will be obtained as with the preceding embodiments, the only difference being that since the two drive pawls 36 and 37 are not inclined with respect to each other, but parallel to each other, the two drive pawls will respectively not provide the same moment onto the ratchet gear 2.

It will be understood that each of the elements described above, or two or more together, may also find a useful application in other types of ratchet drives differing from the types described above.

While the invention has been illustrated and described as embodied in a ratchet drive with an equal load double pawl arrangement, especially used for ratchet drive operated wrenches, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A ratchet drive with an equal load double pawl arrangement comprising support means; a ratchet gear mounted on said support means for turning about its axis; a pair of drive pawls; drive plate means for moving said drive pawls about said axis along an active stroke and a return stroke, said drive pawls having front ends arranged for engaging teeth of said ratchet gear during each active stroke to thereby turn said ratchet gear through a given angle in one direction; means connecting the rear ends of said two drive pawls to said drive plate means for shifting, if due to manufacturing tolerances the front end of only one of said drive pawls should during the active stroke of said drive plate means initially engage a corresponding tooth, the other drive pawl in substantially axial direction into engagement with another tooth to equalize the load onto said two teeth during each active stroke of said drive plate means, said connecting means comprising a member mounted on said drive plate means tiltable about a pivot axis spaced from said axis of said ratchet gear, a leaf spring fastened to said member and engaging one face of one of said drive pawls for biasing the latter into engagement with the teeth of said ratchet gear; and a projection in the region of said front end of the other drive pawl and engaging a face opposite said one face of said one drive pawl.

2. A ratchet drive with an equal load double pawl arrangement comprising support means; a ratchet gear mounted on said support means for turning about its axis; a pair of drive pawls; drive means for moving said drive pawls about said axis along an active stroke and a return stroke, said drive pawls having front ends arranged for engaging teeth of said ratchet gear during each active stroke to thereby turn said ratchet gear through a given angle in one direction, said drive means comprising two transversely spaced drive plates mounted on said support means for tilting movement about said axis between said active and said return stroke; and means connecting the rear ends of said two drive pawls to said drive means for shifting, if due to manufacturing tolerances the front end of only one of said drive pawls should during the active stroke of said drive means initially engage a corresponding tooth, the other drive pawl in substantially axial direction into engagement with another tooth to equalize the load onto the two teeth during each active stroke of said drive means, said connecting means comprising a member mounted on said drive plate means tiltable about a pivot axis spaced from said axis of said ratchet gear, said rear ends of said two drive pawls being mounted on said member to opposite sides of said pivot axis, each of said drive plates being formed with a first bore coaxial with the axis of said ratchet gear and with a second bore coaxial with said pivot axis, said ratchet gear and said member having each a main portion located between said drive plates and a pair of trunnions respectively projecting to opposite sides of said main portion and being respectively turnably mounted in said first and said second bores of said drive plates.

3. A ratchet drive as defined in claim 2, wherein said rear ends of said drive pawls are of semi-cylindrical configuration and wherein said member is formed with a pair of cutouts respectively located to opposite sides of said pivot axis and having each a portion of semi-cylindrical configuration against which said semi-cylindrical ends of said drive pawls respectively abut during said active stroke of said drive plate means to take up the thrust imparted to the pawls, and means operatively connected to said member and said pawls for maintaining the rear ends of the latter in said cutouts during the return stroke of said drive plate means.

4. A ratchet drive as defined in claim 3, wherein said maintaining means comprise a pair of annular discs respectively sandwiched between said pair of drive plates and said main portion of said member and surrounding said trunnions of the latter, a pair of pins respectively mounted in bores through the rear ends of said drive pawls coaxial with said semi-cylindrical portions thereof and extending with clearance through corresponding bores in said discs and also with clearance through a coaxial bore in said main portion of said member.

5. A ratchet drive as defined in claim 4, wherein said main portion of said member is of substantially cylindrical configuration coaxial with the axis of said trunnions thereof, wherein said cutouts extend from the peripheral surface of said cylindrical main portion in the latter and widen from the inner semi-cylindrical portions thereof towards the peripheral surface to permit tilting of said drive pawls about said pins relative to said member during the return stroke of the drive plate means.

6. A ratchet drive as defined in claim 2, wherein said main portion of said member is plate shaped, wherein the rear end of each drive pawl is bifurcated and encompasses a portion of said plate shaped main portion, and including a pair of pivot pins respectively located to opposite sides of the axis of said trunnions of said member and passing through bores in said member and corresponding bores through said bifurcated rear ends of said drive pawls.

7. A ratchet drive as defined in claim 6, wherein said plate shaped main portion of said member is of substantially triangular outline with said trunnions located in the region of one corner of said triangular plate shaped main portion and said pins respectively located in the region of the two other corners.

8. A ratchet drive as defined in claim 2, wherein at least said main portion is provided with a cutout extending from the outer surface thereof thereinto and having a pair of parallel side faces and an end face normal to the latter, said drive pawls being arranged in side by side engagement with each other and the rear ends thereof being pressfitted into said cutout with the rear faces of said drive pawls engaging said end face of said cutout.

9. A ratchet drive as defined in claim 8, wherein said cutout extends also through said trunnions to facilitate machining of said cutout.

10. A ratchet drive as defined in claim 2, wherein said main portion and said trunnions of said ratchet gear are formed with a polygonal passage therethrough coaxial with the axis of said ratchet gear for engagement with a polygonal head of a threaded connector for tightening or loosening the head.

* * * * *